(12) United States Patent
Pabba et al.

(10) Patent No.: US 9,575,531 B2
(45) Date of Patent: Feb. 21, 2017

(54) MULTI-VENDOR POWER DISTRIBUTION UNIT SUPPORT IN RACK MANAGEMENT SOFTWARE

(71) Applicant: AMERICAN MEGATRENDS, INC., Norcross, GA (US)

(72) Inventors: Chittaraiah Pabba, Cumming, GA (US); Joseprabu Inbaraj, Suwanee, GA (US)

(73) Assignee: AMERICAN MEGATRENDS, INC., Norcross, GA (US)

( * ) Notice: Subject to any disclaimer, the term of this patent is extended or adjusted under 35 U.S.C. 154(b) by 323 days.

(21) Appl. No.: 13/966,399

(22) Filed: Aug. 14, 2013

(65) Prior Publication Data

US 2015/0052371 A1 Feb. 19, 2015

(51) Int. Cl.
G06F 1/26 (2006.01)

(52) U.S. Cl.
CPC ...................... *G06F 1/266* (2013.01)

(58) Field of Classification Search
CPC ............ G06F 1/26; G06F 1/32; G06F 1/3203; G06F 1/3209
See application file for complete search history.

(56) References Cited

U.S. PATENT DOCUMENTS

| | | | |
|---|---|---|---|
| 6,219,708 B1 | 4/2001 | Martenson | |
| 6,445,087 B1 * | 9/2002 | Wang | H01R 25/003 307/139 |
| 7,143,153 B1 | 11/2006 | Black et al. | |
| 7,302,486 B1 * | 11/2007 | Pai | H04L 41/0213 707/E17.032 |
| 7,657,635 B2 * | 2/2010 | Yip | H04L 12/1432 709/202 |
| 8,166,539 B2 | 4/2012 | Pan | |
| 8,392,575 B1 | 3/2013 | Marr | |
| 8,656,003 B2 | 2/2014 | Yu | |
| 8,930,517 B2 | 1/2015 | Hsien | |
| 8,938,529 B2 | 1/2015 | Khessib et al. | |
| 2002/0052940 A1 * | 5/2002 | Myers | G06F 1/266 709/223 |
| 2003/0069955 A1 | 4/2003 | Gieseke et al. | |
| 2003/0069956 A1 | 4/2003 | Gieseke et al. | |
| 2004/0177143 A1 | 9/2004 | Maciel et al. | |

(Continued)

*Primary Examiner* — Fahmida Rahman
(74) *Attorney, Agent, or Firm* — Locke Lord LLP; Tim Tingkang Xia, Esq.

(57) ABSTRACT

A PDU management system for automatically configure, manage and monitor managed power distribution units (PDUs) includes: (a) a user interface module configured to allow an operator to enter management information of the managed PDUs, (b) a database configured to store management information of the managed PDUs, (c) a power management communication interface configured to facilitate the communication between the PDU management system and the managed PDUs through a communication link, (d) a PDU power management module configured to construct, manage, and monitor the managed PDUs, (e) a PDU discovery module configured to discover all managed PDUs according to the information entered by the operator through the user interface module, (f) a PDU loader to load the management information of the managed PDUs to the database, the PDU discovery module and the PDU power management module.

20 Claims, 7 Drawing Sheets

(56) References Cited

U.S. PATENT DOCUMENTS

| | | |
|---|---|---|
| 2005/0071699 A1* | 3/2005 | Hammond ................ G06F 1/30 |
| | | 713/300 |
| 2006/0277297 A1 | 12/2006 | Kellagher et al. |
| 2009/0222733 A1 | 9/2009 | Basham et al. |
| 2009/0234512 A1 | 9/2009 | Ewing et al. |
| 2010/0214940 A1 | 8/2010 | Macauley |
| 2010/0306559 A1* | 12/2010 | Ewing ....................... G06F 1/26 |
| | | 713/300 |
| 2011/0138291 A1* | 6/2011 | Twiddy ............... H04L 41/0213 |
| | | 715/735 |
| 2012/0246305 A1* | 9/2012 | Vedula ................ H04L 41/0813 |
| | | 709/224 |
| 2013/0212411 A1* | 8/2013 | Nicholson ................ H04L 12/10 |
| | | 713/310 |
| 2013/0275543 A1 | 10/2013 | Jain |
| 2013/0339503 A1 | 12/2013 | Annamalaisami et al. |
| 2014/0006597 A1 | 1/2014 | Ganguli et al. |
| 2014/0297855 A1 | 10/2014 | Moore et al. |
| 2014/0304398 A1 | 10/2014 | Carlen et al. |

\* cited by examiner

200

```
[DISCOVERY]
probe                    ="PowerNet-MIB::rPDUOutletDevNumCntrlOutlets.0"

[POWERMONITOR]
getpower                 ="PowerNet-MIB::rPDUIdentDevicePowerWatts.0"

[PDUMANAGEMENT]
getnumoutlets            ="PowerNet-MIB::rPDUIdentDeviceNumOutlets.0"
getalloutlet             ="PowerNet-MIB::sPDUMasterState.0"
getalloutletpending      ="PowerNet-MIB::sPDUMasterPending.0"
getpowerstatus           ="PowerNet-MIB::rPDUOutletStatusOutletState."
poweroff                 ="PowerNet-MIB::sPDUOutletCtl."
poweron                  ="PowerNet-MIB::sPDUOutletCtl."
reboot                   ="PowerNet-MIB::sPDUOutletCtl."
getpowerondelay          ="PowerNet-MIB::sPDUOutletPowerOnTime."
setpowerondelay          ="PowerNet-MIB::sPDUOutletPowerOnTime."
getpoweroffdelay         ="PowerNet-MIB::sPDUOutletPowerOffTime."
setpoweroffdelay         ="PowerNet-MIB::sPDUOutletPowerOffTime."
getrebootdelay           ="PowerNet-MIB::sPDUOutletRebootDuration."
setrebootdelay           ="PowerNet-MIB::sPDUOutletRebootDuration."
getnoofphase             ="PowerNet-MIB::rPDUIdentDeviceNumPhases.0"
getoverloadthreshold     ="PowerNet-MIB::rPDULoadPhaseConfigOverloadThreshold.phase"
setoverloadthreshold     ="PowerNet-MIB::rPDULoadPhaseConfigOverloadThreshold.phase"
getnearoverloadthreshold="PowerNet-MIB::rPDULoadPhaseConfigNearOverloadThreshold.phase"
setnearoverloadthreshold="PowerNet-MIB::rPDULoadPhaseConfigNearOverloadThreshold.phase"
getlowloadthreashold     ="PowerNet-MIB::rPDULoadPhaseConfigLowLoadThreshold.phase"
setlowloadthreashold     ="PowerNet-MIB::rPDULoadPhaseConfigLowLoadThreshold.phase"
getnumtrapreceiver       ="PowerNet-MIB::mconfigNumTrapReceivers.0"
getreceiverip            ="PowerNet-MIB::receiverAddr."
setreceiverip            ="PowerNet-MIB::receiverAddr."
getrecvipcommunity       ="PowerNet-MIB::communityString."
setrecvipcommunity       ="PowerNet-MIB::communityString."
getreceiverstatus        ="PowerNet-MIB::acceptThisReceiver."
setreceiverstatus        ="PowerNet-MIB::acceptThisReceiver."

[CONSTANT]
outleton                 ="1"
outletoff                ="2"
outletreboot             ="3"
outletunknown            ="4"
outletonwithdelay        ="5"
outletoffwithdelay       ="6"
outletrebootwithdelay    ="7"
```

FIG. 2

MULTI-VENDOR POWER DISTRIBUTION UNIT SUPPORT IN RACK MANAGEMENT SOFTWARE

FIELD

The present disclosure generally relates to computer server rack management, and more particularly to multi-vendor Power Distribution Unit (PDU) support in rack management software.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

With the proliferation of computer data centers, and computer servers, the need has developed for more powerful tools to manage computer racks of computer data centers and servers as they increase in size and complexity. Simple network management protocol (SNMP) is one facility available for managing computer networks. The SNMP includes two primary elements: a manager and agents. The SNMP manager is the console through which a network administrator performs rack management functions. The SNMP agents are entities that interface to the actual managed devices. Power Distribution Units (PDU) with network manageability are examples of managed devices that contain managed objects. The managed objects of each managed device might be hardware, configuration parameters, performance statistics, and so on, that directly relate to the current operation of the managed device. The managed objects are arranged in a management information base (MIB) and each managed object is referred to as an object in the MIB. The SNMP allows managers and agents to communicate for the purpose of accessing these MIB objects.

Typically, the MIB is organized in a tree structure composed of branch nodes and leaf nodes. The MIB objects representing the managed objects of the same network device usually reside at the leaf nodes rooting from the same branch node. Each MIB object has an object identifier (OID), which is a sequence of integers in a tree structure that uniquely identifies the MIB object residing at a leaf node. When the manager requests a value of a MIB object from an agent, the OID of the MIB object should be sent by the manager and traversed by the agent.

Though the SNMP access is simple due to the small number of command messages, it requires that the user have in-depth knowledge of the MIB, and particularly be familiar with the OID of each MIB object. Also, building the variable binding which includes the OID and the corresponding object value is typically a tedious task and is subject to human errors. Additionally, PDU products from various vendors will have significant differences and these differences make the monitoring and managing these PDUs a difficult task. Therefore, it will be advantageous to have a system that allows the operator to upload the MIB associated with the specific PDUs to be managed, and to map the PDU functionalities with MIB OID's to facilitate the management of the PDUs.

Therefore, heretofore unaddressed needs still exist in the art to address the aforementioned deficiencies and inadequacies.

SUMMARY

In one aspect, the present disclosure relates to a PDU management system for configuring, monitoring and managing managed power distribution units (PDU). In certain embodiments, the PDU management system includes: (a) a user interface module configured to allow an operator to enter management information of the managed PDUs, (b) a database configured to store management information of the managed PDUs, (c) a power management communication interface configured to facilitate the communication between the PDU management system and the managed PDUs through a communication link, (d) a PDU power management module configured to construct, monitor, and manage of the managed PDUs, (e) a PDU discovery module configured to discover all managed PDUs according to the information entered by the operator through the user interface module, and (f) a PDU loader to load the management information of the managed PDUs to the database, the PDU discovery module and the PDU power management module.

In certain embodiments, the management information of the managed PDUs includes: (a) names of the manufacturer of the managed PDUs, (b) model numbers of the managed PDUs, (c) IP addresses of the managed PDUs, (d) names of the managed PDUs, (d) management information base (MIB) files of each unique manufacturer, and (e) a standard set of management functions for the managed PDUs. In one embodiment, the management information of the managed PDUs is entered manually through the user interface module. In another embodiment, the management information of the managed PDUs is entered automatically by reading a set of pre-edited files. The set of pre-edited files include at least a management information base (MIB) file containing all management functions and its related object identification (OID), and an INI file containing a standard set of power management functions of the PDU management system. The PDU power management module parses the MIB file, maps the standard set of power management functions of the managed PDUs, and obtains the object identification (OID) associated with the standard set of power management functions of the managed PDUs. The standard set of power management functions of the PDU management system in the INI file includes a subset of the management functions available to the managed PDU from its manufacturer. In one embodiment, the MIB file is parsed and the standard management functions are mapped manually by using the user interface module. In another embodiment, the MIB file is parsed and the standard management functions are mapped automatically by using the PDU power management module.

In certain embodiment, the PDU discovery module is configured to: (a) load the management information of the managed PDUs through the PDU loader from the database, (b) discover the managed PDUs installed in a rack through the power management communication interface and the communication link based on the management information of the managed PDUs including their IP addresses, and (c) create one entry in the database for each discovered PDU for individual management of the discovered PDU.

In certain embodiments, the PDU power management module uses simple network management protocol (SNMP) to manage the managed PDUs, and the PDU management system is a manager and the managed PDU is an agent. The PDU power management module further includes a web interface to allow the operator to perform management functions remotely through internet, LAN, WAN, and Wi-Fi networks. In certain embodiments, the PDU power management module further includes a command line interface (CLI) to allow the operator to perform management functions locally through a RS-232 network.

In another aspect, the present disclosure relates to a method for a PDU management system configured to construct, monitor and manage managed power distribution unit (PDU). In certain embodiments, the method includes: (a) entering management information of the managed PDU by an operator using a user interface module of the PDU management system, (b) storing the management information of the managed PDU into a database of the PDU management system using a PDU loader, (c) loading management information of the managed PDUs through the PDU loader to a PDU discovery module, (d) discovering the managed PDUs installed on a rack one by one based on the management information of the managed PDUs, (e) creating one entry in the database for each discovered PDU for power management, (f) updating the PDU status and OID of the discovered PDU in the database individually, (g) loading the OID information and a set of pre-determined power management functions through the PDU loader to a PDU power management module, and (h) monitoring and managing the managed PDUs through the PDU power management module.

In certain embodiments, the entering management information step further includes: (i) entering management information of the managed PDU manually through the user interface module, and (ii) entering management information of the managed PDU automatically by reading a set of pre-edited files through the user interface module. The management information of the managed PDUs includes: (a) names of the manufacturer of the managed PDUs, (b) model numbers of the managed PDUs, (c) IP addresses of the managed PDUs, (d) names of the managed PDUs, (e) management information base (MIB) files of each unique manufacturer, and (f) a standard set of management functions for the managed PDUs. The set of pre-edited files comprises at least a management information base (MIB) file containing all management functions and its related object identification (OID), and an INI file containing a standard set of power management functions of the PDU management system. The PDU power management module parses the MIB file, maps the standard set of power management functions of the managed PDUs, and obtains the object identification (OID) associated with the standard set of power management functions of the managed PDUs.

In certain embodiments, the standard set of power management functions of the PDU management system in the INI file contains a subset of the management functions available to the managed PDU from its manufacturer. In one embodiment, the MIB file is parsed and the standard management functions are mapped manually by using the user interface module. In another embodiment, the MIB file is parsed and the standard management functions are mapped automatically by using the PDU power management module. The PDU management system further has a power management communication interface configured for the PDU management system to communicate with the managed PDUs through a communication link. The PDU power management module uses simple network management protocol (SNMP) to monitor and manage the managed PDUs.

In certain embodiments, the PDU power management module further includes a web interface to allow the operator to perform management functions remotely through internet, LAN, WAN, and Wi-Fi networks. The PDU power management module further has a command line interface (CLI) to allow the operator to perform management functions locally through a RS-232 network.

BRIEF DESCRIPTION OF THE DRAWINGS

The accompanying drawings illustrate one or more embodiments of the disclosure and, together with the written description, serve to explain the principles of the disclosure. Wherever possible, the same reference numbers are used throughout the drawings to refer to the same or like elements of an embodiment, and wherein:

FIG. 2 shows an exemplary INI file of a PDU according to one embodiment of the present disclosure.

DETAILED DESCRIPTION

Figure 1:
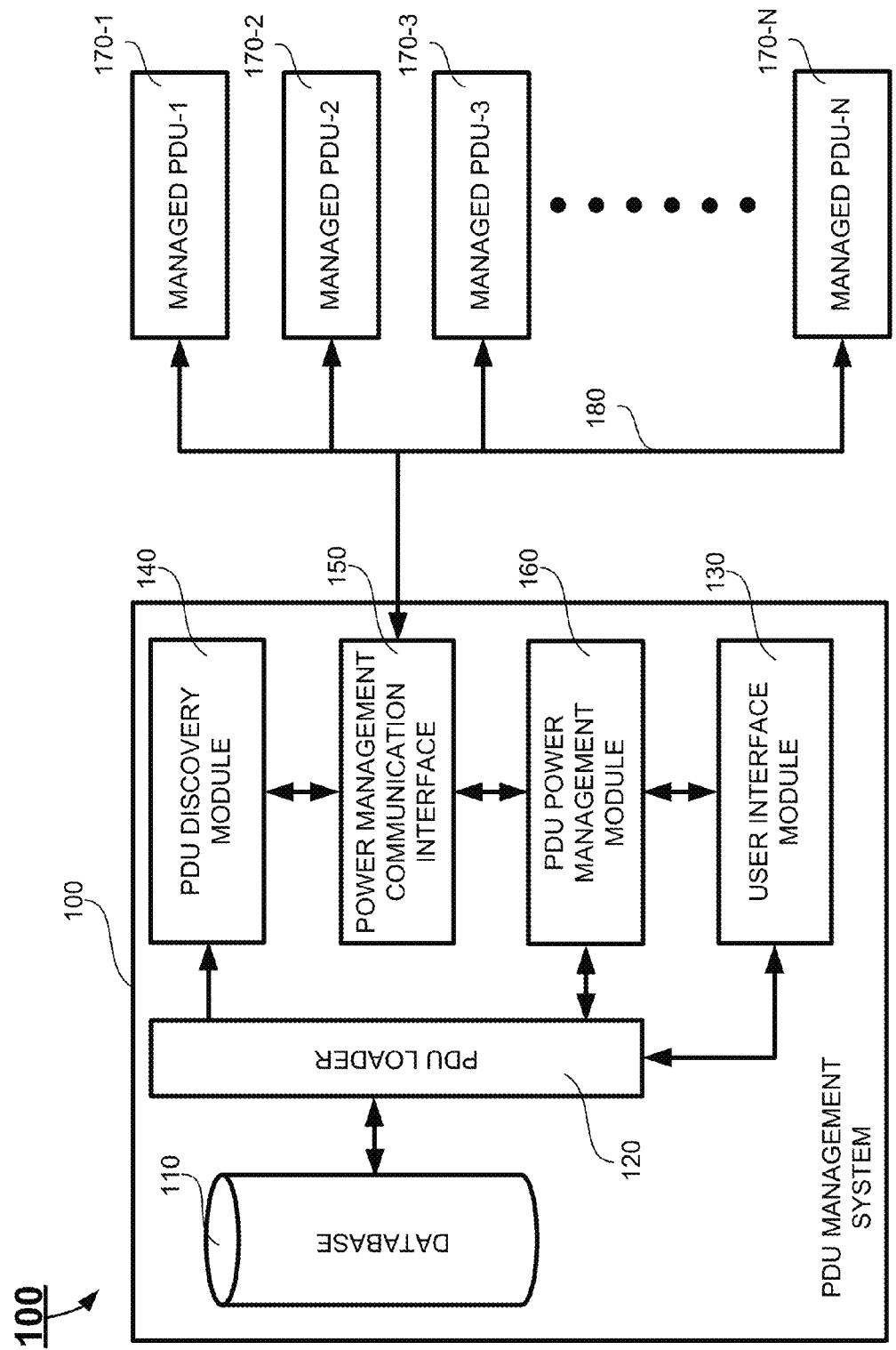
FIG. 1 schematically shows a block diagram of a PDU management system for managing power distribution unit (PDU) devices according to one embodiment of the present disclosure.

The present disclosure is more particularly described in the following examples that are intended as illustrative only since numerous modifications and variations therein will be apparent to those skilled in the art. Various embodiments of the disclosure are now described in detail. Referring to the drawings, like numbers, if any, indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise. Moreover, titles or subtitles may be used in the specification for the convenience of a reader, which shall have no influence on the scope of the present disclosure. Additionally, some terms used in this specification are more specifically defined below.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the disclosure or of any exemplified term. Likewise, the disclosure is not limited to various embodiments given in this specification.

Unless otherwise defined, all technical and scientific terms used herein have the same meaning as commonly understood by one of ordinary skill in the art to which this disclosure pertains. In the case of conflict, the present document, including definitions will control.

As used herein, "around", "about" or "approximately" shall generally mean within 20 percent, preferably within 10 percent, and more preferably within 5 percent of a given value or range. Numerical quantities given herein are approximates, meaning that the term "around", "about" or "approximately" can be inferred if not expressly stated.

As used herein, "plurality" means two or more.

As used herein, the terms "comprising," "including," "carrying," "having," "containing," "involving," and the like are to be understood to be open-ended, i.e., to mean including but not limited to.

As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

The present disclosure will now be described more fully hereinafter with reference to the accompanying drawings, FIGS. 1-7, in which embodiments of the disclosure are shown. This disclosure may, however, be embodied in many different forms and should not be construed as limited to the embodiments set forth herein; rather, these embodiments are provided so that this disclosure will be thorough and complete, and will fully convey the scope of the disclosure to those skilled in the art. Like numbers refer to like elements throughout.

In computer server centers or data centers, a large amount of computers, servers, routers, disk arrays, switches are mounted on one or more racks and powered by power distribution units (PDUs). Monitoring and managing the operations of these PDUs are critically important. A power distribution unit (PDU) is a device fitted with multiple outputs designed to distribute electric power, especially to racks of computers and networking equipment located within the computer server centers or data centers. Some PDUs provide remote access. Common methods are accessible through SNMP and include a RS-232 serial connection (for local management) using a command-line interface (CLI) or a LAN network-controller (for remote management) using a web page. This allows an administrator to monitor and manage the PDU from a remote terminal and interface with it to turn outlets on or off, to schedule power shutdowns, to control load, etc. This can be helpful if a remote machine has gone into an unresponsive state and will not restart through normal means. An administrator can connect to the PDU the machine is plugged into to power-cycle the machine.

Referring now to FIG. 1, a block diagram of a PDU management system 100 is schematically shown for managing power distribution unit (PDU) devices according to one embodiment of the present disclosure. The PDU management system 100 includes a database 110, a PDU loader 120, a user interface module 130, a PDU discovery module 140, a power management communication interface 150, a PDU power management module 160, a plurality of managed PDUs 170-I, I=1, 2, . . . , N, and a communication link 180 configured to provide communication channel between the power management communication interface 150 of the PDU management system 100, and the managed PDUs 170-I, I=1, 2, . . . , N.

In certain embodiments, the PDU management system 100 includes one or more operating systems as well as one or more application programs. The operating system can include a set of programs that control operations of the managed RS-232 interfaces or LAN/WAN devices using TCP/IP protocol. The application programs also provide a graphical user interface to the administrator. An application program is software that runs on top of the operating system software and uses computer resources made available through the operating system to perform application specific tasks desired by the user. The operating system is operable to multitask, i.e., execute computing tasks in multiple threads, and thus may be any of the following: MICROSOFT CORPORATION's "WINDOWS 95," "WINDOWS CE," "WINDOWS 98," "WINDOWS 2000" or "WINDOWS NT", "WINDOWS Vista,", "WINDOWS 7," and "WINDOWS 8," operating systems, IBM's OS/2 WARP, APPLE's MACINTOSH OSX operating system, LINUX, UNIX, etc.

In certain embodiments, the PDU management system 100 may include a web browser for remote access through the internet (not shown in FIG. 1), such as the INTERNET EXPLORER web browser from MICROSOFT CORPORATION of Redmond, Wash., that enables a remote management computer (not shown in FIG. 1) communicate over the Internet, local area network (LAN), wide area network (WAN) 104 with the PDU management system 100.

In certain embodiments, the PDU management system 100 may include a RS-232 connection (not shown in FIG. 1), such that the administrator can use a command line interface that enables a local management computer (not shown in FIG. 1) to communicate over the RS-232 connection with the PDU management system 100.

In embodiment, the database 110 stores management information of all supported PDUs from various vendors, including the name of the manufacture, the model number, an INI file and a management information base (MIB) file of the managed PDUs. The INI file contains the functionalities of the managed PDU devices, including the function names and respective object identification (OID) for the functions. The functions contained in the INI file usually is a subset of all the functions the managed PDU device can perform. The MIB file is a standard SNMP supported file format and it contains the OID values.

At a data center, one or more computer servers, storages and network devices (collectively called nodes) are installed a rack and each computer server, storage and network device requires a PDU unit. The database 110 contains (a) information about a PDU node: NodeInfo, and (b) information about a rack: RackInfo. In certain embodiments, the RackInfo includes: rack name, power limit, and type of power management information. The NodeInfo includes: node name, node IP address, rated power, power zone, inlet temperature etc. For example: following is exemplary information for two PDUs in a rack:

| | |
|---|---|
| Rack Name: | BMCRack |
| Rated Power: | 1000 W |
| Type of PM: | BMC |
| Node Name: | PDU-1 |
| Server IP: | 10.10.1.1 |
| Rated Power: | 200 W |
| Power Zone: | Critical |
| Inlet Temp: | 22 |
| Node Name: | PDU-1 |
| Server IP: | 10.10.1.2 |
| Rated Power: | 200 W |
| Power Zone: | Critical |
| Inlet Temp: | 22 |

In certain embodiments, the management information such as NodeInfo and RackInfo can also be imported, saved, exported, edited in text files, Microsoft Excel files, or other file formats, and a proprietary rack definition language (RDL) can also be used for these formats. Because of the various tags used in XML file, the readability and editability of XML files are improved comparing to the text files, and Microsoft Excel files. In certain embodiments, the RDL uses XML file format including many different tags to allow the PDU power management system to identify the key PDU power management functions or parameter necessary for the PDU power management. Following is a highlight of the RDL:

- The comments are introduced in between "<?" and "?>";
- This example is an XML file and uses the XML version 1.0, and UTF-8 encoding;
- Multiple racklist can be placed between the tags <racklist> and </racklist>;
- Each rack is placed between the tags <rack> and </rack>;
- The rack name, powerlimit, and type are located within the <rack> tag, as shown in the example, the rack name is BMCRack, the rack powerlimit is 1000 watts, and it's a BMC rack, one of the two types of rack: Host rack and BMC rack;
- Multiple nodes can be placed between the tags <node> and </node> with corresponding names in between the <name> and </name> tags, as shown in the example, PDU-1, and PDU-2 are the nodes (managed devices) installed in the BMCRack;
- The IP address of the node is placed in between <ipaddress> and </ipaddress> tags;
- The ratedpower of the node is placed in between <ratedpower> and </ratedpower> tags;
- The powerzone of the node is placed in between <powerzone> and </powerzone> tags;
- The inlettemp of the node is placed in between <powerzone> and </powerzone> tags;
- Many other tags may be added between the <node> and </node> tags as part of the attribute of the node; and
- Many nodes can be inserted between the <rack> and </rack> tags as the rack increases its managed devices.

Following is an exemplary XML file for two PDUs in the rack:

```
<?xml version="1.0" encoding="UTF-8"?>
<racklist>
<rack name= "BMCRack" powerlimit="1000" type="bmc">
  <node>
    <name>PDU-1</name>
    <ipaddress>10.10.1.1</ipaddress>
    <ratedpower>200</ratedpower>
    <powerzone>Critical</powerzone>
    <inlettemp>22</inlettemp>
  </node>
  <node>
    <name>PDU-1</name>
    <ipaddress>10.10.1.2</ipaddress>
    <ratedpower>200</ratedpower>
    <powerzone>Critical</powerzone>
    <inlettemp>22</inlettemp>
  </node>
</rack>
</racklist>
```

In one embodiment, the database 110 stores information regarding all supported managed devices including the name of the manufacturer, the model number, the INI file, and the MIB file of all supported PDU. The INI file contains supported functionalities of the PDU including the function names and respective object identifications (OIDs) for these functions. The MIB file is a standard SNMP supported file format and it contains the corresponding OID values.

In embodiment, the PDU loader 120 interacts with the database 110 and stores information to and retrieves information from the database 110. The PDU loader 120 performs following functions:

- store and retrieve NodeInfo;
- store and retrieve RackInfo;
- store and retrieve MIB and INI files; and
- store and retrieve related object identifiers (OID).

The PDU loader 120 interacts with the device discovery module 140 to discover all managed PDUs 170-I, I=1, 2, . . . , N that are networked through the network channel 180, and retrieves rack and node information from each and every one of the PDUs and store the rack and node information into the database 110.

The PDU loader 120 interacts with the PDU management module 160 to update rack and node information of the managed PDUs 170-I, I=1, 2, . . . , N, and stores and updates rack and node information in the database 110.

The PDU loader 120 interacts with the user interface module 130 to retrieve rack and node information, the MIB information, and OID information from external files, such as XML files, Excel Files, and text files etc. The rack information, the node information, the MIB and the OID information are then stored in the database 110.

In certain embodiments, the user interface module 130 allows the administrator to enter management information about the managed devices such as the PDUs installed on the rack. The management information can be entered either manually line by line through a series of parameters editing screens, or by automatic method through reading a number of files. The files include text files, XML files, Excel files, or a proprietary rack definition language (RDL) file. Once the management information of the managed PDUs is entered, the management information is transmitted to the PDU power management module 160 for processing. The PDU power management module 160 maps the MIB information into a subset of basic PDU management functions, obtains the corresponding OID of each management function, and saves the subset of basic set of PDU management functions and their corresponding OIDs into the database 110 by using the PDU loader 120.

FIG. 2 shows an exemplary INI file of a PDU according to one embodiment of the present disclosure, and an exemplary subset of basic PDU management functions is listed under the entry of [PDUMANAGEMENT]. In one embodiment, there can be more than 3000 objects and more than 3000 OIDs in a complete MIB for a specific product. In one embodiment, the INI file 200 includes only a small subset of the management functions available to the PDU from a specific manufacture. In the following example, only 29 power management functions and 17 unique OIDs are included in the power management software. In one embodiment, the INI file 200 includes only a small subset of the management functions available to the PDU from APC. It includes 4 sections:

1. Discovery $probe = \text{``}PowerNet\text{-}MIB::rPDUOutletDevNumCntrlOutlets.0\text{''}$ $= 1.3.6.1.4.1.318.1.1.12.3.1.3;$ 2. PowerMonitor $getpower = \text{``}PowerNet\text{-}MIB::rPDUIdentDevicePowerWatts.0\text{''}$ $= 1.3.6.1.4.1.318.1.1.12.1.16$ 3. PDUManagement $Getnumoutlets = \text{``}PowerNet\text{-}MIB::rPDUIdentDeviceNumOutlets.0\text{''}$ $= 1.3.6.1.4.1.318.1.1.12.1.16$ $getalloutlet = \text{``}PowerNet\text{-}MIB::sPDUMasterState.0\text{''}$ $= 1.3.6.1.4.1.318.1.1.4.2.2;$ $getalloutletpending = \text{``}PowerNet\text{-}MIB::sPDUMasterPending.0\text{''}$ $= 1.3.6.1.4.1.318.1.1.4.2.3;$ $getpowerstatus = \text{``}PowerNet\text{-}MIB::rPDUOutletStatusOutletState\text{''}$ $= 1.3.6.1.4.1.318.1.1.12.3.5.1.1.4$ $poweroff = \text{``}PowerNet\text{-}MIB::sPDUOutletCtl.\text{''}$ $= 1.3.6.1.4.1.318.1.1.4.4.2.1.3$ $poweron = \text{``}PowerNet\text{-}MIB::sPDUOutletCtl.\text{''}$ $= 1.3.6.1.4.1.318.1.1.4.4.2.1.3$ $reboot = \text{``}PowerNet\text{-}MIB::sPDUOutletCtl.\text{''}$ $= 1.3.6.1.4.1.318.1.1.4.4.2.1.3$ $getpowerondelay = \text{``}PowerNet\text{-}MIB::sPDUOutletPowerOnTime\text{''}$ $= 1.3.6.1.4.1.318.1.1.4.5.2.1.2$ $setpowerondelay = \text{``}PowerNet\text{-}MIB::sPDUOutletPowerOnTime\text{''}$ $= 1.3.6.1.4.1.318.1.1.4.5.2.1.2$ $getpoweroffdelay = \text{``}PowerNet\text{-}MIB::sPDUOutletPowerOffTime\text{''}$ $= 1.3.6.1.4.1.318.1.1.4.5.2.1.4$ $setpoweroffdelay = \text{``}PowerNet\text{-}MIB::sPDUOutletPowerOffTime\text{''}$ $= 1.3.6.1.4.1.318.1.1.4.5.2.1.4$ $getrebootdelay = \text{``}PowerNet\text{-}MIB::sPDUOutletRebootDuration\text{''}$ $= 1.3.6.1.4.1.318.1.1.4.5.2.1.5$ $setrebootdelay = \text{``}PowerNet\text{-}MIB::sPDUOutletRebootDuration\text{''}$ $= 1.3.6.1.4.1.318.1.1.4.5.2.1.5$ -continued

*getnoofphase* = "*PowerNet-MIB::rPDUIdentDeviceNumPhases.0*"
  = 1.3.6.1.4.1.318.1.1.12.1.9

*getoverloadthreshold* = "*PowerNet-MIB::rPDULoadPhaseConfigOverloadThresholdphase*"
  = 1.3.6.1.4.1.318.1.1.12.2.2.1.1.4

*setoverloadthreshold* = "*PowerNet-MIB::rPDULoadPhaseConfigNearOverloadThresholdphase*"
  = 1.3.6.1.4.1.318.1.1.12.2.2.1.1.4

*getnearoverloadthreshold* = "*PowerNet-MIB::rPDULoadPhaseConfigNearOverloadThresholdphase*"
  = 1.3.6.1.4.1.318.1.1.12.2.2.1.1.3

*setnearoverloadthreshold* = "*PowerNet-MIB::rPDULoadPhaseConfigNearOverloadThresholdphase*"
  = 1.3.6.1.4.1.318.1.1.12.2.2.1.1.3

*getlowloadthreashold* = "*PowerNet-MIB::rPDULoadPhaseConfigLowLoadThresholdphase*"
  = 1.3.6.1.4.1.318.1.1.12.2.2.1.1.2

*setlowloadthreashold* = "*PowerNet-MIB::rPDULoadPhaseConfigLowLoadThresholdphase*"
  = 1.3.6.1.4.1.318.1.1.12.2.2.1.1.2

*sgetnumtrapreceiver* = "*PowerNet-MIB::mconfigNumTrapReceivers.0*"
  = 1.3.6.1.4.1.318.2.1.1

*getreceiverip* = "*PowerNet-MIB::receiverAddr.*"
  = 1.3.6.1.4.1.318.2.1.2.1.2

*setreceiverip* = "*PowerNet-MIB::receiverAddr.*"
  = 1.3.6.1.4.1.318.2.1.2.1.2

*getrecvipcommunity* = "*PowerNet-MIB::communityString.*"
  = 1.3.6.1.4.1.318.2.1.2.1.3

*setrecvipcommunity* = "*PowerNet-MIB::communityString.*"
  = 1.3.6.1.4.1.318.2.1.2.1.3

*getreceiverstatus* = "*PowerNet-MIB::acceptThisReceiver.*"
  = 1.3.6.1.4.1.318.2.1.2.1.5

*setreceiverstatus* = "*PowerNet-MIB::acceptThisReceiver.*"
  = 1.3.6.1.4.1.318.2.1.2.1.5

4. Constants
outleton="1"
outletoff="2"
outletreboot="3"
outletunknown="4"
outletonwithdelay="5"
outletoffwithdelay="6"
outletrebootwithdelay="7"

The user interface 130 facilitates the administrator with options for configuring an application for various features according to the user needs and identifies the attributes of the product to meet the requirements of an end user. This helps the user to manage a device easily and effectively. Various feature configurations are as follows:

setting global user account, add, edit, delete and save user accounts
 authenticate users;
 configuring device (node) discovery range
 adding single device
 adding a rack
 adding power distribution unit (PDU) to the rack
 adding host server to PDU
 edit single managed device, rack, PDU, BMC server, and BMC rack
 automating rack builder
 authenticating discovered devices
 configuring monitoring settings
 configuring power zone settings
 performing remote control actions
 retrieving and reviewing event logs
 generating and reviewing report information about PDU, inlet temperature monitor
 configuring email alerts
 retrieving SNMP Trap log information
 managing using scripts
 generating XMS reports based on the information stored in the database In certain embodiments, the device discovery module 140 receives the management information of the managed PDUs such as the MIB files and INI files through the PDU loader 120, and based on a pre-determined IP address range, the device discovery module 140 of the PDU management system 100 discovers connected and managed PDUs 170-I, I=1, 2, . . . , N through the power management communication interface 150 and the communication link 180. Once the managed devices 170-I are discovered, the managed devices 170-I and a basic set of PDU management functions are mapped, and their corresponding OIDs are all stored back to the database 110, through the PDU loader 120. The PDU management system 100 is ready to perform monitoring and managing functions to the managed PDUs 170-I. The managed PDUs 170-I discovered are authenticated through the user interface 130.

[[*getoverloadthreshold* = "*PowerNet-MIB::rPDULoadPhaseConfigOverloadThresholdphase.*"
= 1.3.6.1.4.1.318.1.1.12.2.2.1.1.4]]

or

[[*getreceiverip* = "*PowerNet-MIB::receiverAddr.*"
= 1.3.6.1.4.1.318.2.1.2.1.2]]

The power management communication interface 150 is configured to facilitate the communication between the rack management system 100 and the managed PDUs 170-I, using simple network management protocol (SNMP). The main communication channel between the rack management system 100 and the managed devices 170-I is the communication link 180. In one embodiment, the communication is carried out by using a RS-232 interface with a RS-232 connection. In another embodiment, the communication is carried out by using internet through LAN/WAN/Wi-Fi networks. Each of the managed devices 170-I has its unique IP address (node IP address).

Figure 3:
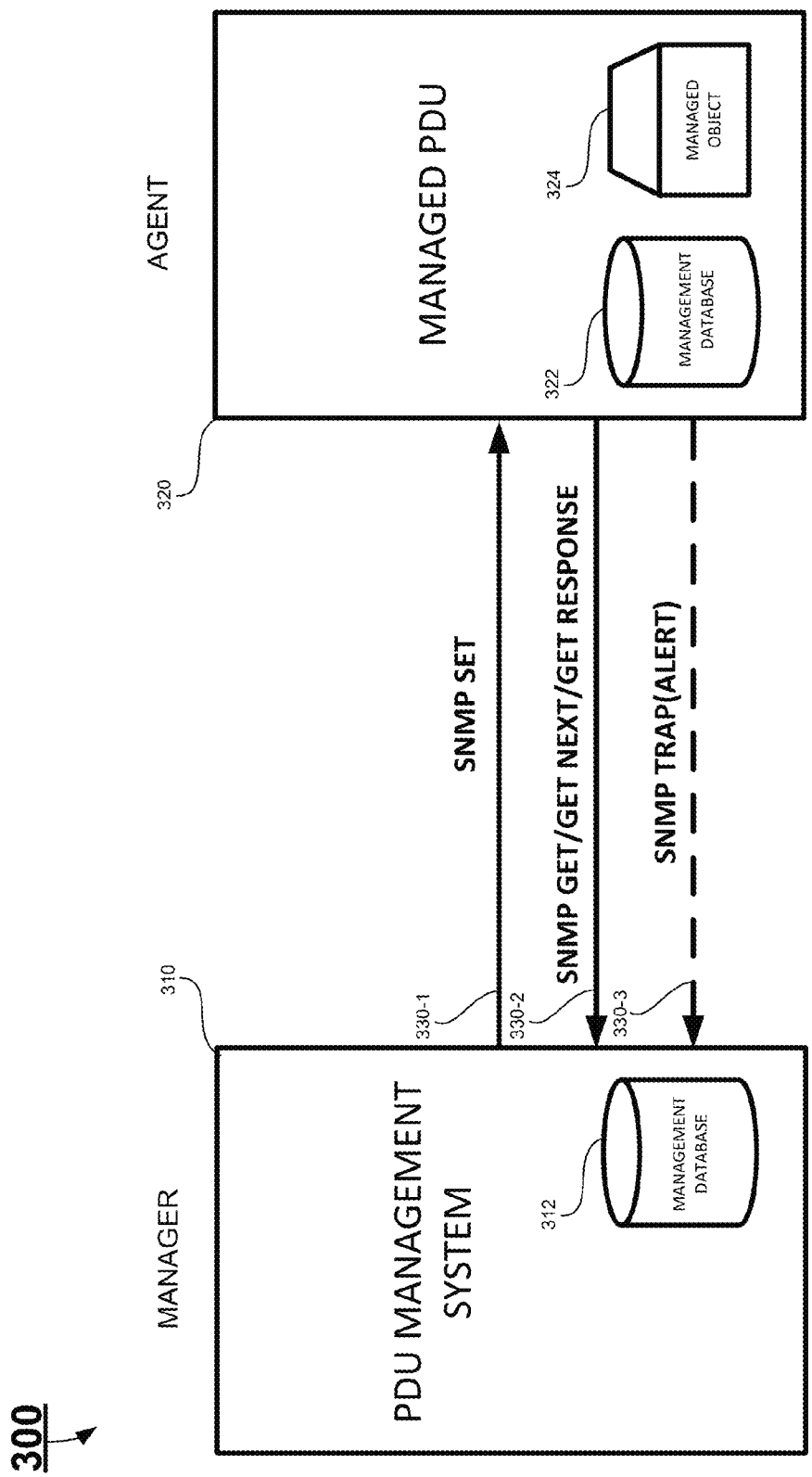
FIG. 3 shows a block diagram illustrating communication between a PDU Management System of managed PDUs in an SNMP network according to one embodiment of the present disclosure.

FIG. 3 shows a block diagram illustrating communication between a PDU Management System of managed PDUs in an SNMP network according to one embodiment of the present disclosure. In this example, a PDU management system (manager) 310 is in communication with a managed PDU (agent) 320, a management information base (MIB) 312 for the manager 310, a management information base (MIB) 322 for the agent 320, managed objects 324 and the network protocol 330. The manager 310 provides the interface between a human network manager and the manager 310. The agent 320 provides the interface between the manager and the physical device(s) being managed such as a PDU.

The manager and agent use a Management Information Base (MIB) and a relatively small set of commands to exchange information. In order to be able to manage a large amount of PDU from various vendors, the MIB 312 for the manager 310 is usually a small subset of the MIB 322 for the agent. In the example shown in FIG. 2, only 29 power management functions and 17 unique OIDs are included in the MIB 312 for the manager 310 and used by the PDU management software.

Typically, the MIB is organized in a tree structure composed of branch nodes and leaf nodes. The MIB objects representing the managed objects of the same network device usually reside at the leaf nodes rooting from the same branch node. Each MIB object has an object identifier (OID), which is a sequence of integers in a tree structure that uniquely identifies the MIB object residing at a leaf node. When the manager 310 requests a value of a MIB object from an agent 320, the OID of the MIB object should be sent by the manager 310 and traversed by the agent 320.

SNMP access is used to perform management function on a computer server rack, and a variable binding that contains an OID, a type and a corresponding object value, should be built. The variable bindings are the actual data that are transported back and forth inside SNMP messages. Typically, the SNMP uses five basic messages: GET, GET-NEXT, GET-RESPONSE 330-2, SET 330-1, and TRAP 330-3 to communicate between the manager 310 and the agent 320. For instance, when the manager wants to know the value of an MIB object, such as get an overload threshold of a PDU, or get an agent IP address, the manager will assemble a GET packet 330-2 that includes to the agent 320. Upon receiving the GET packet, the agent 320 will assemble and send a GET-RESPONSE packet to the manager 310 with either the current value of the MIB object or an error indication (TRAP) as to why the request cannot be processed. Similarly, the manager 310 will assemble a SET packet that includes the OID for each MIB object of interest, thereby requesting a change be made to the value of the MIB object. The agent 320 will then respond with a SET-RESPONSE packet indicating the change has been made or an error (TRAP) indication as to why the change cannot be made. The agent 320 can also assemble and send a TRAP packet that includes OID and value information (bindings) to spontaneously inform the manager of an important event. The manager can use the bindings to correlate and manage the event.

Though the SNMP access is simple due to the small number of command messages (GET, GET-NEXT, GET-RESPONSE, SET, and TRAP), it requires that the user have in-depth knowledge of the MIB, and particularly be familiar with the OID of each MIB object. Also, building the variable binding which includes the OID and the corresponding object value is typically a tedious task and is subject to human errors. Additionally, PDU products from various vendors will have significant differences and these differences make the monitoring and managing these PDUs a difficult task.

The monitoring and management functions of PDU include one or more of following tasks: building a rack, adding devices to the rack, adding PDU to the rack, adding host server to PDU, adding BMC server to BMC rack, discovery of managed PDUs, rack power limit control, configuring power zone settings, scheduling power zone, scheduling rack power, configuring servers, configuring trap receivers, configuring PDU, configuring power delay, setting threshold, performing remote control actions, monitoring real-time rack power usage, setting rack power limits, monitoring inlet temperature, providing PDU summary, providing server summary, event log information, and email alerts.

The PDU power management module 160 is configured to oversee the operations of the PDU management system 100. The operations include: establishing a rack, configuring the rack, loading MIB files and INI files of vendor-specific PDUs, discovering vendor-specific PDUs, customizing the management of discovered vendor-specific PDUs under management, monitoring and managing the managed PDUs. The PDU power management module 160 performs one or more of following functions:

interacting with the user interface module 130 to receive vendor-specific PDU information;

interacting with the PDU loader 120 to retrieve and store the vendor-specific PDU information to the database 110;

interacting with the power management communication interface 150 to communicate with the managed PDUs over the communication link 180;

interacting with PDU discovery module 140 over the power management communication interface 150 to discover all connected managed PDUs; and monitoring and managing the operations of the managed PDUs.

PDUs are diverse products including basic PDUs, metered PDUs, switched PDUs, switched Per Outlet Power Sensing (POPS), smart PDUs and intelligent PDUs. These PDUs can come from various vendors and each product has specific functionalities different from other PDUs from the same or different manufacturers. These differences are reflected in the differences in the management information base (MIB) and associated functions available for various PDUs from different vendors. For example, the switched POPS has power metering for each power outlet, and metered PDUs may have one power metering per PDU. On the other hand, the basic PDUs may have no power metering functions at all.

As mentioned above, simple network management protocol (SNMP) is one facility available for managing computer networks. The SNMP includes two primary elements: a manager and agents. The SNMP manager is the console through which a network administrator performs rack management functions. The SNMP agents are entities that interface to the actual managed devices. PDU with network manageability are examples of managed devices that contain managed objects. The managed objects of each managed device might be hardware, configuration parameters, performance statistics, and so on, that directly relate to the current operation of the managed device. The managed objects are arranged in a management information base (MIB) and each managed object is referred to as an MIB object in the MIB. The SNMP allows managers and agents to communicate for the purpose of accessing these MIB objects.

In order for a management software to monitor and manage the PDU power supply to the racks, the OIDs of various products used in the rack needs to be entered into the MIB to customize the management of particular products used. Since PDUs are a part of one or more racks, at least one rack has to be established and configured before any PDUs are to be managed. Therefore, the PDU management includes two steps: (1) establish and configure a rack, and (2) configure a plurality of managed PDUs discovered on the rack.

Conventionally, an operator is required to enter the detailed information for each PDU installed in the rack through the user interface module 130 of the PDU management system 100 to set up the MIB line by line. Each product may require the operator to enter up to 50-60 parameters and there may be hundreds of products need to be entered.

Figure 4:
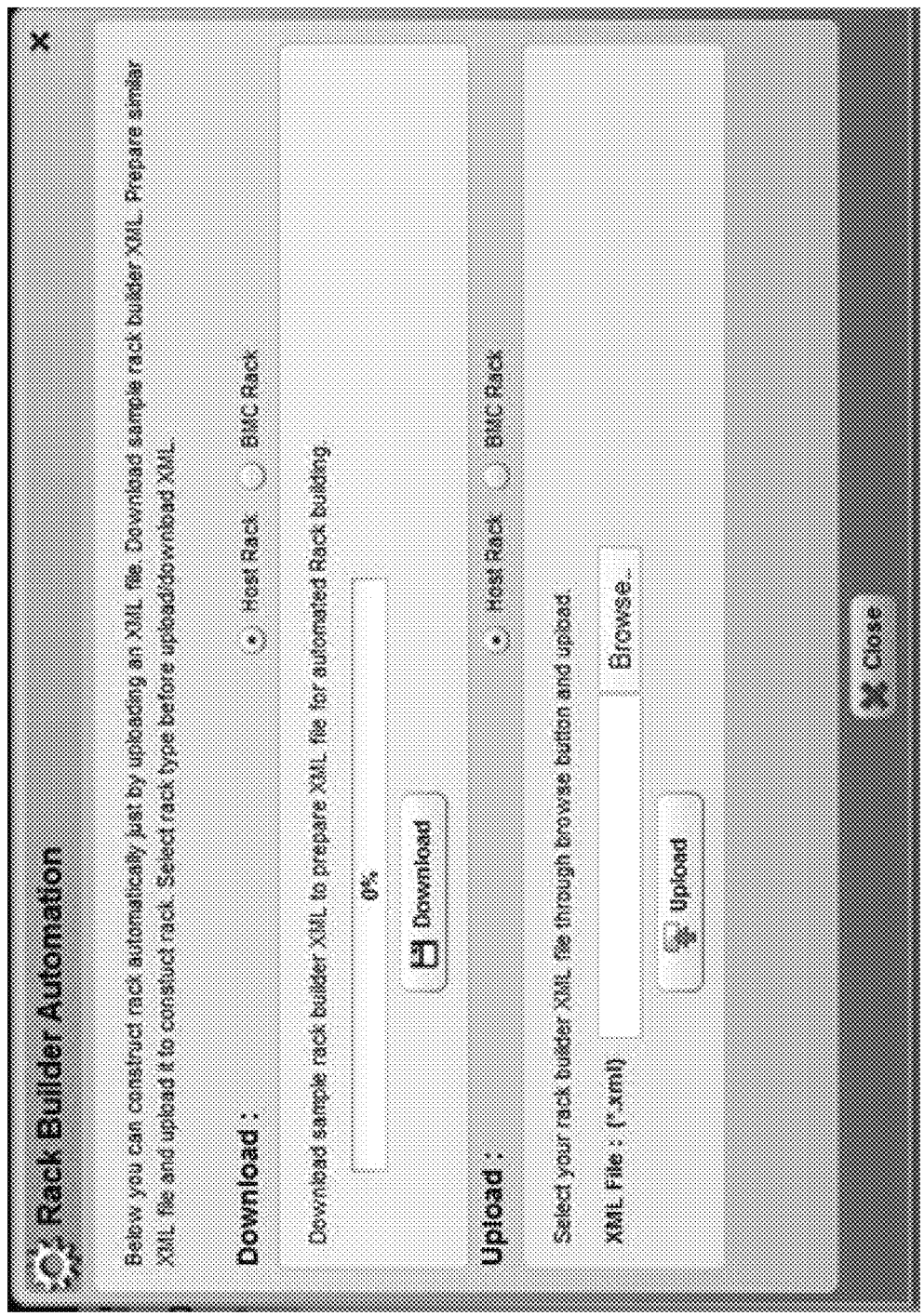
FIG. 4 shows an exemplary user interface for automatically building a rack according to one embodiment of the present disclosure.

FIG. 4 shows an exemplary rack building screen according to one embodiment of the present disclosure. Rack automation is a feature provided to construct a rack. For that, a user will need to create an XML file, which will contain information regarding rack name and their respective devices details.

```
<?xml version="1.0" encoding="UTF-8"?>
<racklist>
  <rack name= "HostRack" powerlimit="1000" type="host">
    <node>
      <name>PDU-1</name>
```

-continued

```
      <ipaddress>10.10.1.1</ipaddress>
      <ratedpower>200</ratedpower>
      <powerzone>Critical</powerzone>
      <inlettemp>22</inlettemp>
    </node>
    <node>
      <name>PDU-1</name>
      <ipaddress>10.10.1.2</ipaddress>
      <ratedpower>200</ratedpower>
      <powerzone>Critical</powerzone>
      <inlettemp>22</inlettemp>
    </node>
  </rack>
</racklist>
```

Following are the steps to construct a Rack automatically as shown in FIG. 4:

(a) the user selects Host Rack from the radio button for downloading the XML file for the selected rack type.

(b) the user clicks Download button to download the sample XML file in the required location for building the rack automatically.

(c) the user selects Host Rack from the radio button for uploading the XML file for the selected rack type.

(d) the user clicks Browse button to open the sample XML file.

(e) the user clicks Upload button to view the result of the operation.

(f) the user clicks OK button to build the rack automatically and is displayed under Power Management Devices in the device tree.

The user can edit a sample XML file for adding or editing the following details. This helps the user to create a rack automatically according to their needs.

Figure 5:
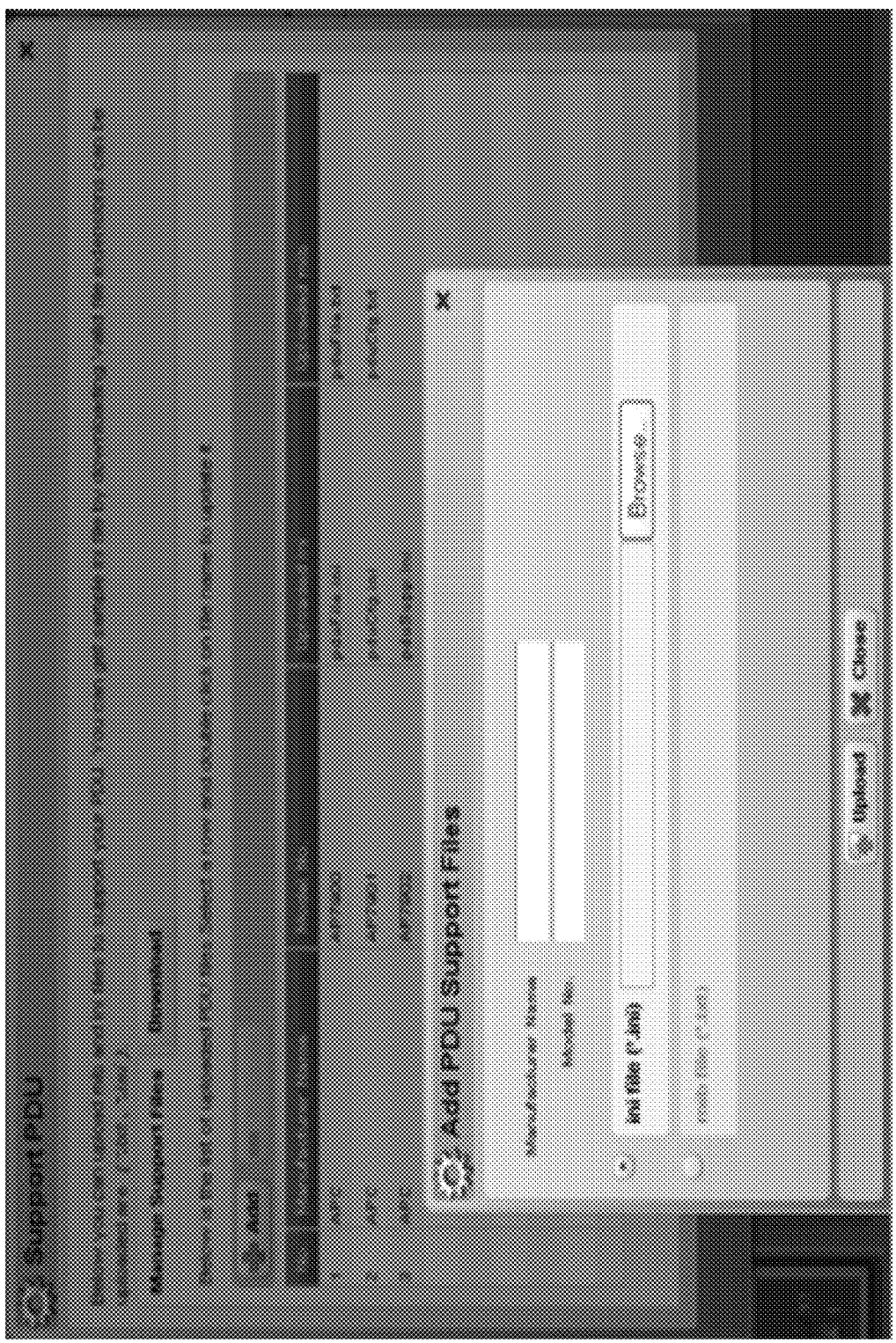
FIG. 5 shows an exemplary user interface for provide dynamic PDU support according to one embodiment of the present disclosure.

Rack name
Rack power limit
Rack type
PDU name
PDU IP address
Host server name
Host server IP address
Rated power
Power zone
Outlet id FIG. 5 shows an exemplary user interface screen for provide dynamic PDU support according to one embodiment of the present disclosure. Following are the steps to provide dynamic PDU support:

(a) the user enters the PDU manufacture name and mode number, upload the MIB, and INI files.

(b) the uploaded MIB and INI files, the manufacturer name, model number and file name are stored at a predetermined location of the database 110.

(c) the device discovery module 140 receives the management information of the managed PDUs such as the MIB files and INI files through the PDU loader 120, and based on a pre-determined IP address range, the device discovery module 140 of the PDU management system 100 discovers connected and managed PDUs 170-I, I=1, 2, . . . , N through the power management communication interface 150 and the communication link 180. Before the device discovery module 140 loads MIB and INI files, the user interface 130 will check for existence of same details in PDU management system 100.

(d) Once all the managed PDUs are discovered, the PDU power management module 160 will map a subset of basic PDU management functions from the managed PDU's MIB and store the mapped subset of basic management functions in the database 110 for the PDU management system 100.

(e) the PDU management system 100 is ready to perform the mapped subset of basic PDU management functions in the database 110.

Figure 6:
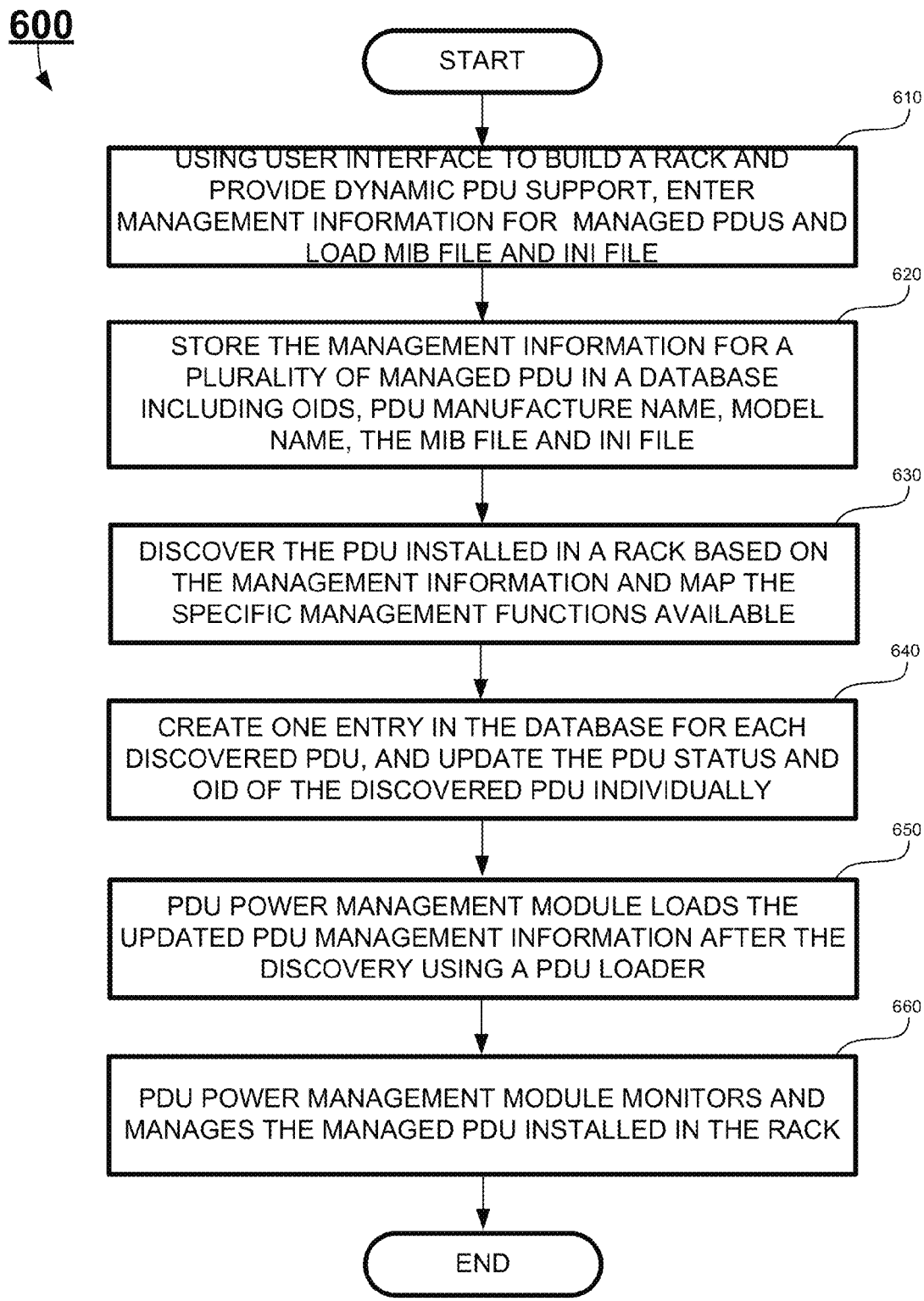
FIG. 6 shows a flow chart of operations of a power management station for managing PDUs according to one embodiment of the present disclosure.

Referring now to FIG. 6, a flow chart 600 of operations of the PDU management system 100 for managing the PDUs according to one embodiment of the present disclosure.

At the Step 610, an operator enters the PDU manufacturer name and model number, IP addresses, PDU names, and uploads related MIB files and INI files associated with the managed PDUs through the user interface module 130. The INI files provides the PDU power management module 160 a standard power management functionality set, which is a subset of the management functions available to the PDU from the manufacturer. The PDU power management module 160 parses the MIB file and map the OID and the standard management functionality set. The parsing of the MIB file and mapping of the standard management functions can be carried out either manually or automatically through the user interface module 130 and PDU power management module 160.

At the Step 620, the PDU power management module 160 saves all management information including PDU manufacturer name, the model number, the IP addresses, the PDU names, the MIB file, selected OIDs, and the standard management functionality set into the database 110 through the PDU loader 120.

At the Step 630, the PDU discovery module 140 discovers the plurality of connected/installed PDUs in the rack one by one based on their IP addresses and matches the specific management functions available to the managed PDUs. The PDU discovery module 140 of the PDU management system 100 retrieves PDU information from database 110 through the PDU loader 120, and discovers the managed PDUs installed on the rack one by one;

At the Step 640, the PDU power management module 160 creates one entry in the database 110 for each discovered PDU for management, and update the PDU status and OIDs of the discovered PDU individually;

At the Step 650, the PDU power management module 160 loads updated PDU management information, OID information and INI files for the discovered PDUs on the rack using the PDU loader 120 from the database 110.

At the Step 660, the PDU power management module 160 of the PDU management system 100 monitors and manages the plurality of the discovered PDUs.

Figure 7:
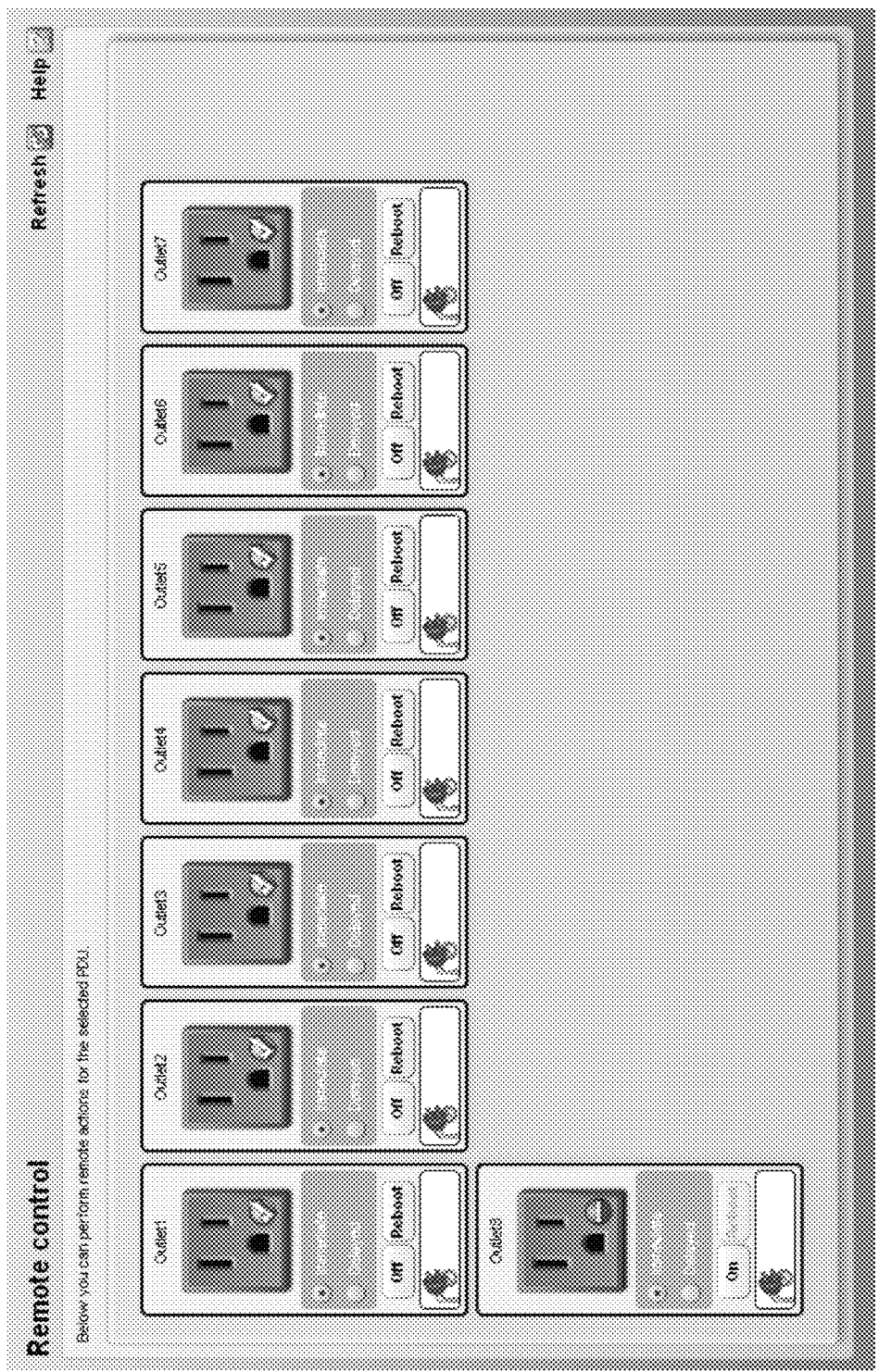
FIG. 7 shows an exemplary remote control user interface for managing a group of power distribution units according to one embodiment of the present disclosure.

FIG. 7 shows an exemplary remote control screen of the user interface 130 to manage a group of power distribution units according to one embodiment of the present disclosure. The user interface 130 shows a total of eight outlets for eight separate power distribution units (PDUs). These outlets can be used to supply electric power source to up to eight managed devices independently. These outlets can be remotely controlled independently by a user using the PDU power management system 100. The check marks on the outlets 1 through 7 indicate these outlets are currently (a) connected to the electrical power source, (b) turned on, and (c) ready to be used. The "–" on the outlet 8 indicates the outlet 8 is currently (a) turned off or not connected to the electrical power source, and (b) not ready to be used.

Each of the outlets 1-8 can be turned ON or OFF by clicking the "ON" or "OFF" buttons below each of the outlets. Additionally, the outlets 1-8 can be used to reboot managed devices connected to the outlets by clicking the "REBOOT" buttons. The reboot action includes (a) turning off the power source, (b) wait a predetermined time period, and (c) turning on the power source again. Both turning "ON" or "OFF" action and "REBOOT" action can be performed immediately or in a time delay. If the user choose to turn "ON" or "OFF", or "REBOOT" immediately, the radio button "IMMEDIATE" is selected. Otherwise, the "DELAYED" radio button is selected. The "ø" sign on the power plug symbol indicates that the managed devices are not physically plugged into the outlets.

An example of how a user uses this remote control screen of the user interface 130 to control the power of the PDU is described below. Assuming the outlet 4 made by APC is currently turned on, and a web server is currently plugged into outlet 4, and the user wants to immediately turn "OFF" the managed web server plugged into outlet 4, he/she can (a) choose the "IMMEDIATE" radio button, and (b) click the "OFF" button. After the user clicks the "OFF" button, the action is transmitted from the user interface 130 to the PDU power management module 160. The PDU power management module 160 retrieves the node information including the subset of MIB and the corresponding OID. In this case, the related OID is poweroff="PowerNet-MIB::sPDUOutletCtl."=1.3.6.1.4.1.318.1.1.4.4.2.1.3. The PDU power management module 160 sends an SNMP message "SET" message along with the OID (1.3.6.1.4.1.318.1.1.4.4.2.1.3) to the agent (outlet 4). Once the outlet 4 receives the OID, the control software of the outlet 4 traverses the MIB of the outlet 4, obtain local OID and executes the set command to turn off the power of the outlet 4.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope. Accordingly, the scope of the present disclosure is defined by the appended claims rather than the foregoing description and the exemplary embodiments described therein.

What is claimed is:

1. A power distribution unit (PDU) management system for configuring, monitoring and managing a plurality of managed PDUs, comprising:

a user interface module configured to allow an operator to enter management information of the plurality of managed PDUs, wherein the management information comprises management information base (MIB) files and defines a selected set of management functions common for the plurality of managed PDUs;

a database configured to store the management information of the plurality of the managed PDUs;

a power management communication interface configured to facilitate the communication between the PDU management system and the plurality of the managed PDUs through a communication link;

a PDU power management module configured to
  parse a respective MIB file for each of the plurality of the managed PDUs to obtain access to the selected set of the management functions at the each PDU, a format of the respective file of a first PDU of the plurality of the managed PDUs being different from a format of the respective file of a second PDU of the plurality of the managed PDUs;

provide an interface at the PDU power management module to receive intructions for operating the selected set of management functions at each of the plurality of the managed PDUs;

operate each of the plurality of the managed PDUs to perform the selected set of management functions based on the parsed respective MIB file of the each PDU;

in response to an instruction received through the interface, the instruction being directed to a particular management function of the selected set of management functions of a particular PDU of the plurality of the managed PDUs, the particular management function being one of a power-on function, a power-off function, or a reboot function, operate the particular PDU to perform the particular function based on an object obtained from the parsed MIB file of the particular PDU;

a PDU discovery module configured to discover all managed PDUs according to the information entered by the operator through the user interface module; and a PDU loader to load the management information of the plurality of the managed PDUs to the database, the PDU discovery module and the PDU power management module.

2. The PDU management system of claim 1, wherein the management information of the plurality of managed PDUs comprises:

names of manufacturers of the plurality of managed PDUs;

model numbers of the plurality of managed PDUs;

IP addresses of the plurality of managed PDUs;

names of the plurality of managed PDUs.

3. The PDU management system of claim 2, wherein the management information of the plurality of managed PDUs is entered manually through the user interface module, or automatically by reading a set of pre-edited files.

4. The PDU management system of claim 3, wherein the set of pre-edited files comprises at least an MIB file containing all management functions and its related object identification (OID), wherein the PDU power management module obtains the object identification (OID) associated with the selected set of power management functions of the plurality of managed PDUs.

5. The PDU management system of claim 4, wherein the MIB file is parsed and the selected set of management functions is mapped manually by using the user interface module, or automatically by using the PDU power management module.

6. The PDU management system of claim 4, wherein the PDU discovery module is configured to load the management information of the plurality of managed PDUs through the PDU loader from the database;

discover the plurality of managed PDUs installed in a rack through the power management communication interface and the communication link based on the management information of the plurality of managed PDUs including their IP addresses; and create one entry in the database for each discovered PDU for individual management of the discovered PDU.

7. The PDU management system of claim 1, wherein the PDU power management module uses simple network management protocol (SNMP) to manage the plurality of managed PDUs, wherein the PDU management system is a manager and a managed PDU is an agent.

8. The PDU management system of claim 7, wherein the PDU power management module further comprises a web interface to allow the operator to perform management functions remotely through at least one of internet, LAN, WAN, and Wi-Fi networks.

9. The PDU management system of claim 7, wherein the PDU power management module further comprises a command line interface (CLI) to allow the operator to perform management functions locally through a RS-232 network.

10. A method for a power distribution unit (PDU) management system configured to construct, monitor and manage a plurality of managed PDUs comprising steps of:

entering management information of the plurality of managed PDUs by an operator using a user interface module of the PDU management system, wherein the management information comprises management information base (MIB) files and defines a selected set of management functions common for the plurality of managed PDUs;

storing the management information of the plurality of managed PDUs into a database of the PDU management system using a PDU loader;

loading management information of the plurality of managed PDUs through the PDU loader to a PDU discovery module;

discovering the plurality of managed PDUs installed on a rack one by one based on the management information of the plurality of managed PDUs;

parsing, by a PDU power management module, a respective MIB file for each of the plurality of the managed PDUs to obtain access to the selected set of the management functions at the each PDU, a format of the respective file of a first PDU of the plurality of the managed PDUs being different from a format of the respective file of a second PDU of the plurality of the managed PDUs;

providing an interface at the PDU power management module to receive intructions for operating the selected set of management functions at each of the plurality of the managed PDUs;

operating each of the plurality of the managed PDUs to perform the selected set of management functions based on the parsed respective MIB file of the each PDU;

in response to an instruction received through the interface, the instruction being directed to a particular management function of the selected set of management functions of a particular PDU of the plurality of the managed PDUs, the particular management function being one of a power-on function, a power-off function, or a reboot function, operating, by the PDU power management module, the particular PDU to perform the particular function based on an object obtained from the parsed MIB file of the particular PDU;

creating one entry in the database for each discovered PDU for power management;

updating the PDU status and object identification (OID) of the discovered PDU in the database individually;

loading the OID information and a set of pre-determined power management functions through the PDU loader to the PDU power management module; and monitoring and managing the plurality of managed PDUs through the PDU power management module.

11. The method of claim 10, wherein the entering management information step further comprises:
  entering management information of the plurality of managed PDUs manually through the user interface module, or
  entering management information of the plurality of managed PDUs automatically by reading a set of pre-edited files through the user interface module.

12. The method of claim 11, wherein the management information of the plurality of managed PDUs comprises:
  names of manufacturers of the plurality of managed PDUs;
  model numbers of the plurality of managed PDUs;
  IP addresses of the plurality of managed PDUs; and
  names of the plurality of managed PDUs.

13. The method of claim 12, wherein the set of pre-edited files comprises at least an MIB file containing all management functions and its related OID, wherein the PDU power management module obtains the OID associated with the selected set of power management functions of the plurality of managed PDUs.

14. The method of claim 13, wherein the MIB file is parsed and the selected set of management functions is mapped manually by using the user interface module, or automatically by using the PDU power management module.

15. The method of claim 10, wherein the PDU management system further comprises a power management communication interface configured for the PDU management system to communicate with the plurality of managed PDUs through a communication link.

16. The method of claim 10, wherein the PDU power management module uses simple network management protocol (SNMP) to monitor and manage the plurality of managed PDUs.

17. The method of claim 10, wherein the PDU power management module further comprises a web interface to allow the operator to perform management functions remotely through at least one of internet, LAN, WAN, and Wi-Fi networks.

18. The method of claim 10, wherein the PDU power management module further comprises a command line interface (CLI) to allow the operator to perform management functions locally through a RS-232 network.

19. A non-transitory computer readable medium storing computer executable code, wherein the code, when executed at a processor of a power distribution unit (PDU) management system, is configured to
  receive, from a user interface module, management information of a plurality of managed PDUs, wherein the management information comprises management information base (MIB) files and defines a selected set of management functions common for the plurality of managed PDUs;
  store, in a database, the management information of the plurality of the managed PDUs;
  facilitate, by a power management communication interface, communication between the PDU management system and the plurality of the managed PDUs through a communication link;
  parse, by a PDU power management module, a respective MIB file for each of the plurality of the managed PDUs to obtain access to the selected set of the management functions at the each PDU, a format of the respective file of a first PDU of the plurality of the managed PDUs being different from a format of the respective file of a second PDU of the plurality of the managed PDUs;
  provide an interface at the PDU power management module to receive intructions for operating the selected set of management functions at each of the plurality of the managed PDUs;
  operate each of the plurality of the managed PDUs to perform the selected set of management functions based on the parsed respective MIB file of the each PDU;
  in response to an instruction received through the interface, the instruction being directed to a particular management function of the selected set of management functions of a particular PDU of the plurality of the managed PDUs, the particular management function being one of a power-on function, a power-off function, or a reboot function, operate, by the PDU power management module, the particular PDU to perform the particular function based on an object obtained from the parsed MIB file of the particular PDU;
  discover, by a PDU discovery module, all managed PDUs according to the management information; and
  load, by a PDU loader, the management information of the plurality of the managed PDUs to the database, the PDU discovery module and the PDU power management module.

20. The non-transitory computer readable medium as claimed in claim 19, wherein the management information of the plurality of managed PDUs is entered automatically by reading a set of pre-edited files, the set of pre-edited files comprises at least an MIB file containing all management functions and its related object identification (OID), and the PDU power management module obtains the object identification (OID) associated with the selected set of power management functions of the plurality of managed PDUs.

* * * * *